(12) United States Patent
Preda et al.

(10) Patent No.: US 11,807,545 B2
(45) Date of Patent: Nov. 7, 2023

(54) PROCESS FOR SEPARATING SCANDIUM FROM COMPLEX SALT MIXTURES

(71) Applicant: Physical Sciences, Inc., Andover, MA (US)

(72) Inventors: Dorin V. Preda, Medford, MA (US); Prakash B. Joshi, Andover, MA (US); Matthew B. Boucher, Belmont, MA (US); Aaron R. Rathmell, Upton, MA (US)

(73) Assignee: Physical Sciences, Inc., Andover, MA (US)

( * ) Notice: Subject to any disclaimer, the term of this patent is extended or adjusted under 35 U.S.C. 154(b) by 342 days.

(21) Appl. No.: 16/826,622

(22) Filed: Mar. 23, 2020

(65) Prior Publication Data

US 2020/0308016 A1    Oct. 1, 2020

Related U.S. Application Data

(60) Provisional application No. 62/823,160, filed on Mar. 25, 2019.

(51) Int. Cl.
| | | |
|---|---|---|
| *C01F 17/00* | (2020.01) | |
| *C01F 17/17* | (2020.01) | |
| *C22B 3/20* | (2006.01) | |
| *C22B 59/00* | (2006.01) | |
| *C01F 17/212* | (2020.01) | |

(52) U.S. Cl.
CPC ............ *C01F 17/17* (2020.01); *C01F 17/212* (2020.01); *C22B 3/20* (2013.01); *C22B 59/00* (2013.01)

(58) Field of Classification Search
CPC .......... C01F 17/17; C01F 17/212; C22B 3/20; C22B 59/00
See application file for complete search history.

(56) References Cited

U.S. PATENT DOCUMENTS

| | | | |
|---|---|---|---|
| 8,968,688 B2 | 3/2015 | Joshi et al. | |
| 9,394,586 B2 | 7/2016 | Joshi et al. | |
| 10,968,500 B1 * | 4/2021 | Verderber | ............... C22B 59/00 |
| 2015/0211094 A1 * | 7/2015 | Vaisanen | ................. C22B 3/165 |
| | | | 423/21.1 |
| 2019/0153562 A1 * | 5/2019 | Wang | ........................ C22B 3/42 |

FOREIGN PATENT DOCUMENTS

CN          106119555 A   * 11/2016

OTHER PUBLICATIONS

P.C. Stevenson and W.E. Nervik, "The Radiochemistry of the Rare Earths, Scandium, Yttrium, and Actinium", Chemistry-Radiation and Radiochemistry, Subcommittee on Radiochemistry National Academy of Sciences-National Research Council (1961) 296 pages.
G.V. Kostikova et al., Radiochemistry, 48 (2006), pp. 467-471.
G.S. Barney, "The Solubilities of Significant Organic Compounds in HLW TankSupernate Solutions-FY1995 Progress Report", WHC-EP-0899 (1985) 42 pages.

* cited by examiner

*Primary Examiner* — Steven J Bos
(74) *Attorney, Agent, or Firm* — Iandiorio Teska & Coleman, LLP (57)    ABSTRACT

A method of separating scandium from a feedstock wherein a scandium enriched solution is produced from the feedstock and the scandium enriched solution is extracted to produce an organic phase of the scandium enriched solution. The organic phase of the scandium enriched solution is re-extracted to produce an aqueous phase including scandium chloride. The aqueous phase is precipitated and calcinated to produce scandium oxide powder.

10 Claims, 10 Drawing Sheets

PROCESS FOR SEPARATING SCANDIUM FROM COMPLEX SALT MIXTURES

RELATED APPLICATIONS

This application claims benefit of and priority to U.S. Provisional Application Ser. No. 62/823,160 filed Mar. 25, 2019, under 35 U.S.C. §§ 119, 120, 363, 365, and 37 C.F.R. § 1.55 and § 1.78, which is incorporated herein by this reference.

FIELD OF THE INVENTION

This invention relates to the recovery of valuable metals from waste products via a separation and refinement process.

BACKGROUND OF THE INVENTION

Multiple processes have been reported for the separation of metallic elements from waste products. See U.S. Pat. No. 9,394,586 incorporated herein by reference. G. V. Kostika et al. describe a process to separate scandium from rare earth elements using triisoamylphosphate/hydrocarbon mixtures in Radiochemistry 2006, 48, 467-471, also incorporated herein by this reference. Scandium is a valuable element used in various metal alloys.

BRIEF SUMMARY OF THE INVENTION

Separating scandium (Sc) from complex salt mixtures is accomplished via a process which includes evaporation, dissolution, solvent extraction, precipitation, and calcination. The preferred process steps provide selective separation of Sc and REE (rare earth elements i.e., lanthanides+ yttrium) salts from other salt contaminants and enrichment of Sc relative to REE. The process was demonstrated for scandium extraction from coal ash. The process may have applicability to other salt types/mixtures.

Featured is one embodiment is a method of separating scandium from a feedstock. The method includes producing a scandium enriched solution from the feedstock, extracting the scandium enriched solution to produce an organic phase of the scandium enriched solution, re-extracting the organic phase of the scandium enriched solution to produce an aqueous phase including scandium chloride, and precipitating and calcinating the aqueous phase to produce scandium oxide powder.

Extracting the scandium enriched solution may include adding one or more solvents such as tributyl phosphate (TBP) and tris-2-ethylhexylphosphate (TEHP) to the scandium enriched solution. Re-extracting the organic phase may include adding an acid to the organic phase.

The method may include subjecting the feedstock to a recovery process to produce a concentrate. Preferably, the concentrate is made into a slurry and filtered to produce a solid precipitate made into the scandium enriched solution by dissolution. The method may also include pre-processing the feedstock. Preferably, the feedstock is coal ash.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

Figure 1:
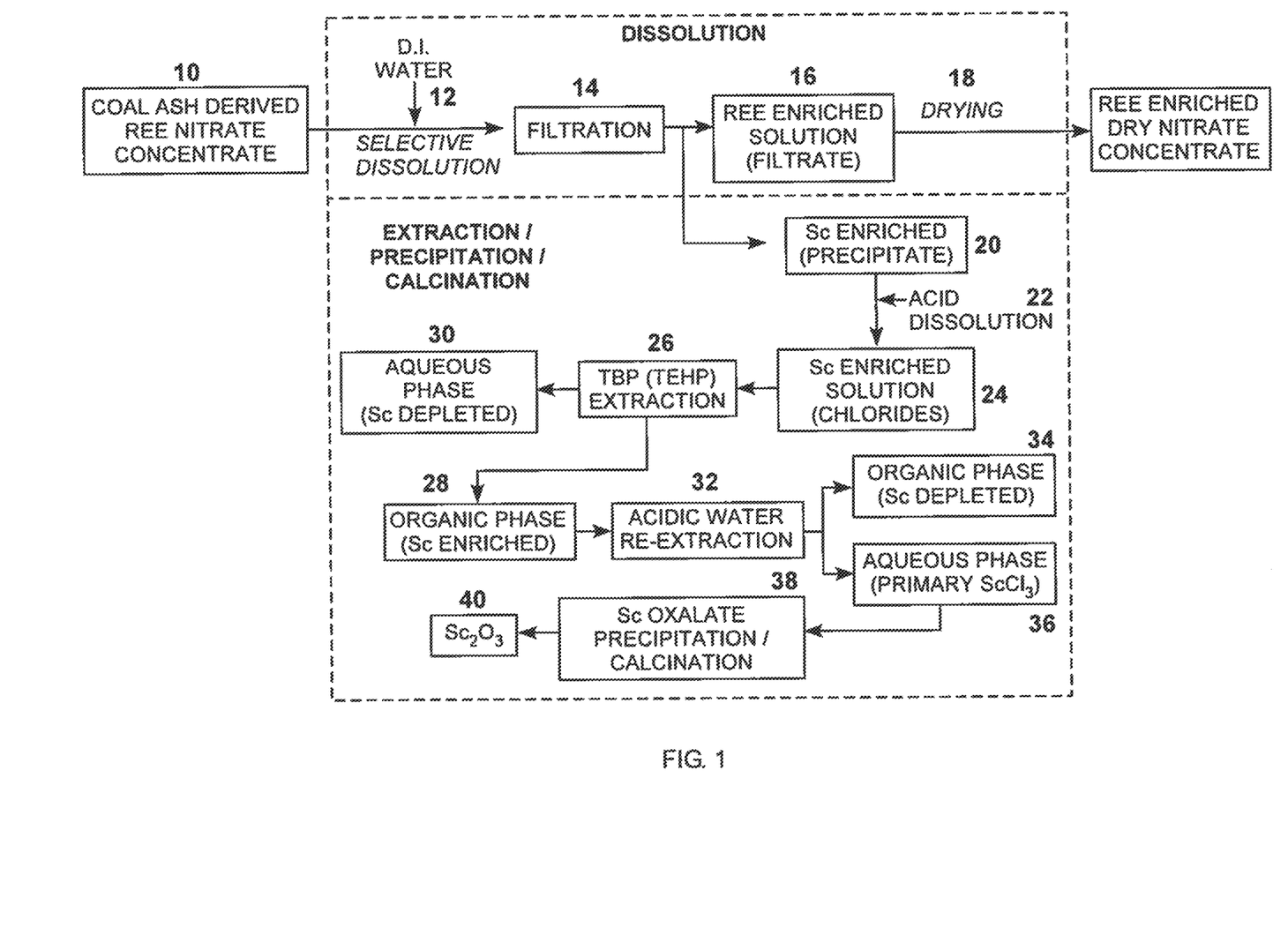
FIG. 1 is a flow chart depicting exemplary steps for Sc separation from coal ash derived REE nitrate concentrate.

One process of this invention preferably entails the separation of the valuable element scandium from the complex salt mixtures. A representative feedstock mixture may be coal ash derived dry REE nitrate concentrate described in U.S. Pat. No. 9,394,586 for the separation of REEs from coal ash waste. This product stream comprises a dry mixture of nitrates of REEs and Sc and can be used as a feedstock for the process. FIG. 1 outlines the basic steps for the scandium separation and enrichment from this feedstock. As shown in FIG. 1, a coal ash derived rare earth elements (REE) nitrate concentrate 10 may serve as the feedstock. Coal ash may be subject to a REE recovery process, for example, as disclosed in U.S. Pat. No. 9,394,586 incorporated herein by this reference. In other examples, the starting feedstock is ash digest.

Preferably, the powder is subject to selective dissolution, step 12, by, for example, adding de-ionized water to the powder producing a slurry which is then filtered (for example using a paper filter), step 14, to produce an REE enriched solution 16 which can be dried, step 18, to produce an REE enriched dried nitrate concentrate.

The solid filtered scandium enriched precipitate 20 is subject to hydrochloric acid dissolution at step 22 to produce a scandium enriched solution 24. This solution is then subjected to an extraction process, step 26, using solvents such as a mixture of tributyl phosphate (TBP) and tris-2-ethylhexylphosphate (TEHP). Using a mixer and settler, an organic phase of the scandium enriched solution is produced as shown as 28. The aqueous phase shown at 30 is separated out. The organic phase is re-extracted (for example by adding hydrochloric acid and using a mixer and settler), step 32, producing an organic phase scandium depleted solution 34 and an aqueous phase of scandium chloride ($ScCl_3$) 36 which is subject to precipitation and calcination, step 38, to produce scandium oxide ($Sc_2O_3$) in power form as shown at 40. Calcination may include heating to 900° C. In some embodiments, the extraction step 26 can be repeated one or more times before the re-extraction step 32.

The individual steps of the process shown in FIG. 1 are discussed below along with experimental results.

Figure 2:
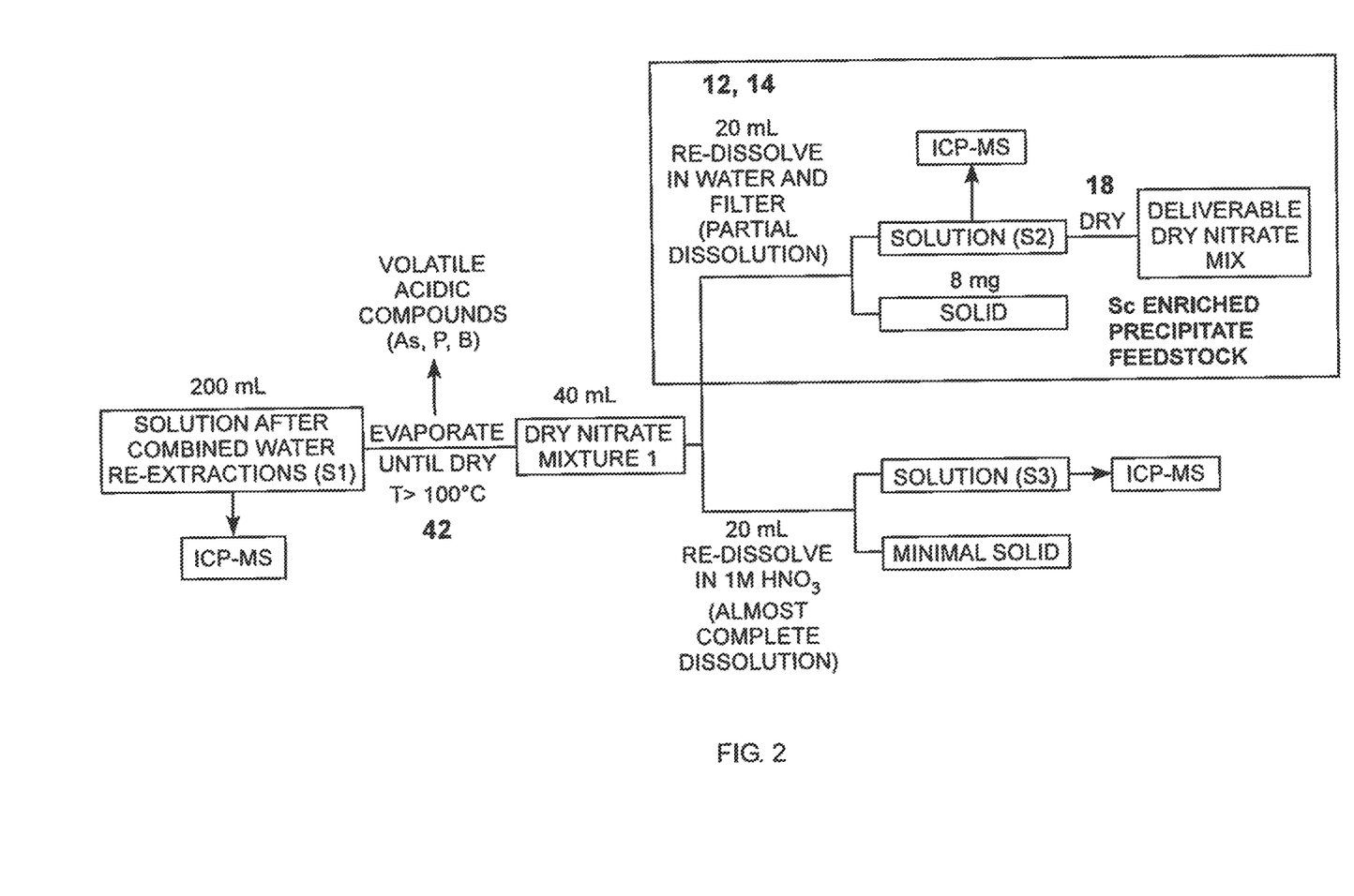
FIG. 2 is a flow chart depicting exemplary steps for Sc enrichment through dissolution.

The dissolution step 12 was demonstrated for samples of coal ash derived REE nitrate concentrate. The feedstock (dry nitrate mixture) was produced from the evaporation to dryness of the aqueous concentrate. In this step (42, FIG. 2.), volatile compounds of As, P, and B compounds are removed. The dry nitrate mixture was then re-dissolved in deionized water and filtered (1M $HNO_3$ was also used instead of deionized water for comparison) steps 12 and 14, FIG. 1. The filtrate was concentrated to dryness (step 18). The overall process along with the experimental parameters is shown in FIG. 2.

All solutions were analyzed by ICP-MS. We used the following designations: S1=Combined water re-extractions; S2=Dry nitrate mixture re-dissolved in water and S3=Dry nitrate mixture re-dissolved in 1M $HNO_3$. The results are presented in FIGS. 3A-3B.

Figure 3A:
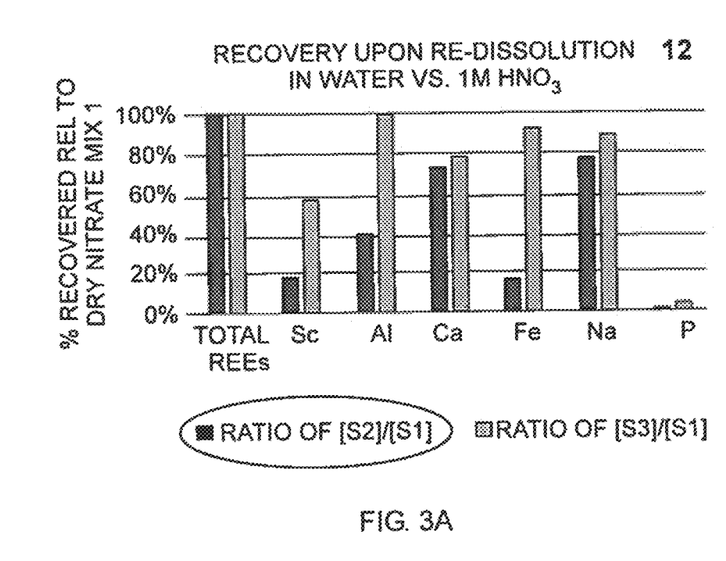
FIGS. 3A-3B are graphs depicting experimental results of one sample.
Figure 3B:
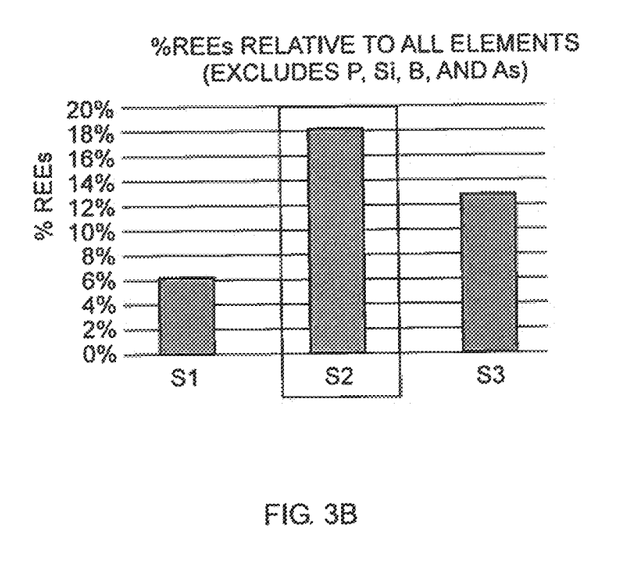

As shown in FIG. 3, the dissolution in water provides high REE recovery and high REE content. Sc(III) nitrate is not very soluble in D1 water, and may require nitric acid to be re-dissolved. The filtered solid from D1 water dissolution process is enriched in Sc and can be used as feedstock for further scandium separation as presented below.

Figure 4A:
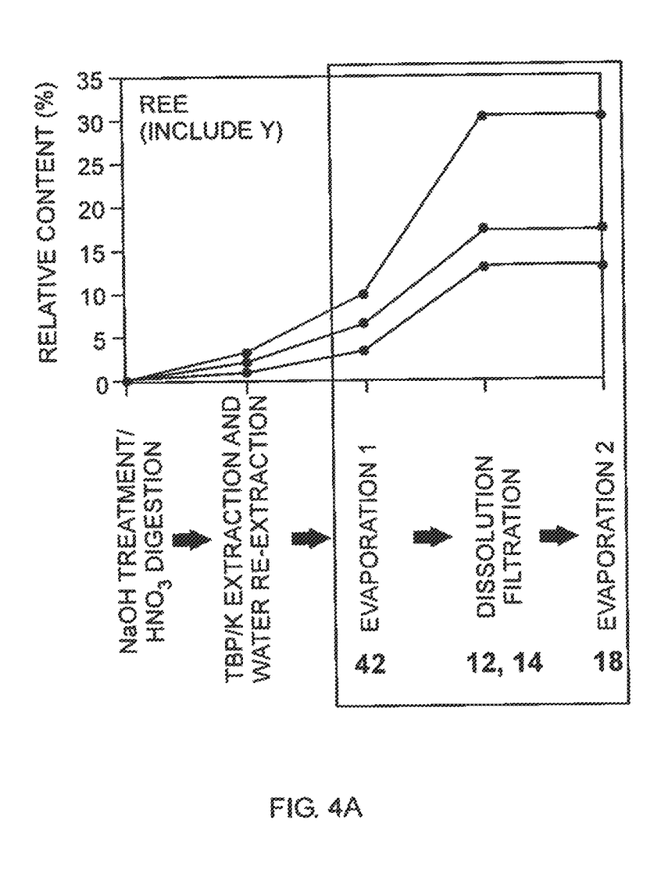
FIGS. 4A-4B are graphs depicting experimental results of another sample.
Figure 4B:
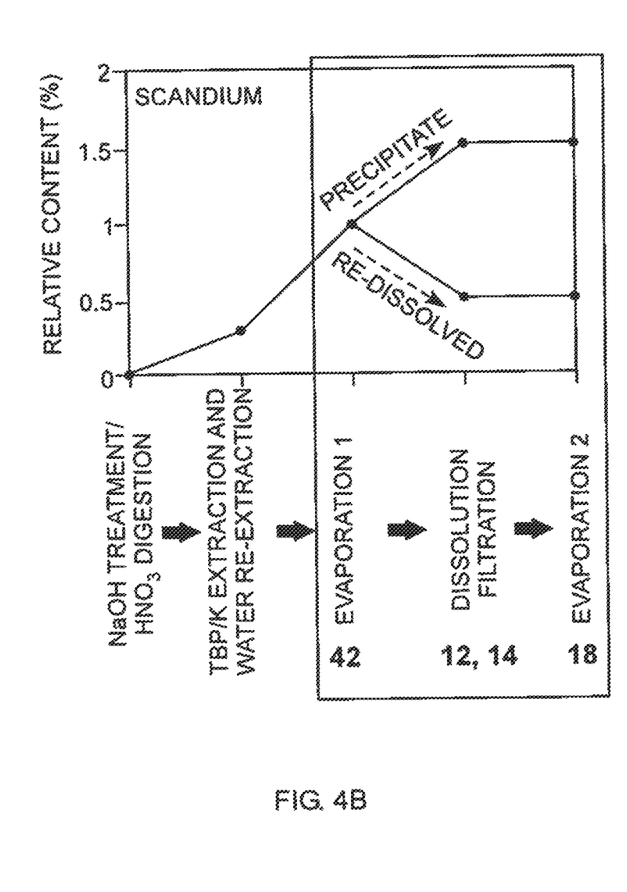

This process was also applied to a second sample of coal ash derived nitrate mixture (from a different ash source) and produced similar results. First, evaporation (step 42, FIG. 2) removed the non-metal compounds. The dissolution followed by filtration (steps 12,14) led to a three times increase in REE enrichment and efficient separation (in the filtrate) from Sc. Conversely, re-dissolution/filtration (steps 12,14) leads to approximately 1.5× enrichment in Sc content (in the precipitate) with efficient separation of REEs. FIGS. 4A and 4B outline the results obtained by ICP-MS measurements (prior steps of PSI REE/Sc recovery process U.S. Pat. No. 9,394,586 are included for comparison).

Figure 5A:
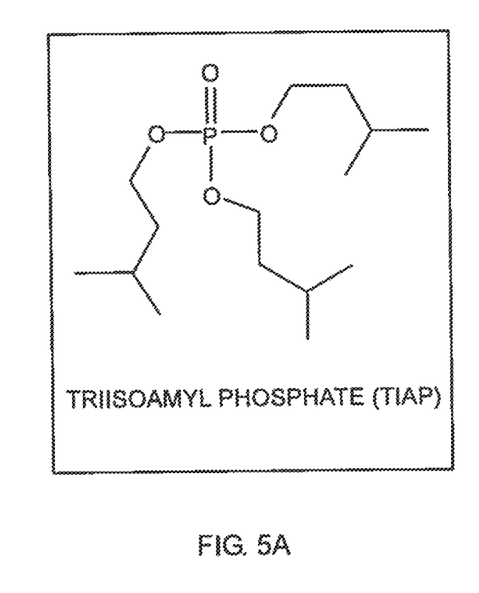
FIGS. 5A-5B depict the chemical structures of TIAP, TBP and TEHP.

The extraction step 26 of the process (see FIG. 1) was demonstrated on representative samples that contained nitrate mixtures of Sc, Nd, Dy, Al, Fe, Ca. These mixtures contain nitrate ratios similar to those of samples produced in dissolution step (Sc enriched precipitate—see FIG. 2). A TIAP solvent (FIG. 5A) can selectively extract Sc from a mixture of REEs in concentrated HCl but the TIAP solvent is rare and not commercially available.

Figure 5B:
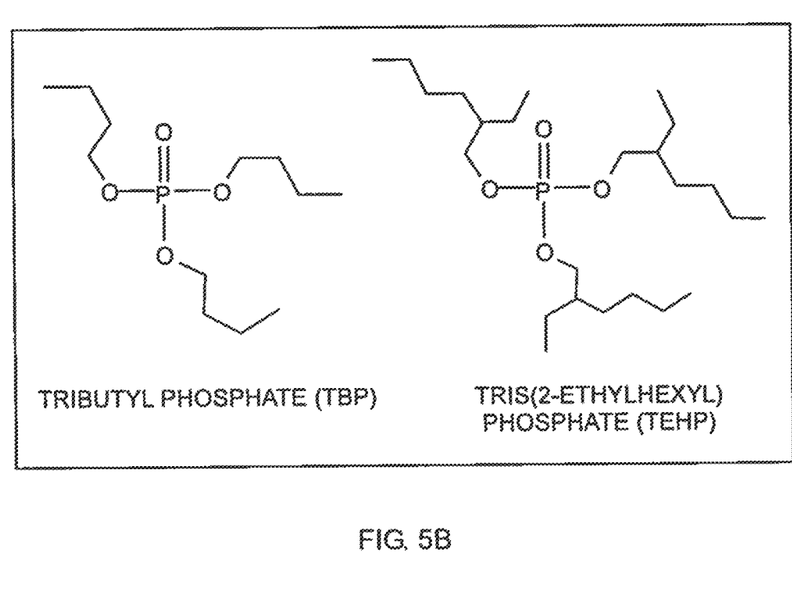
Figure 6:
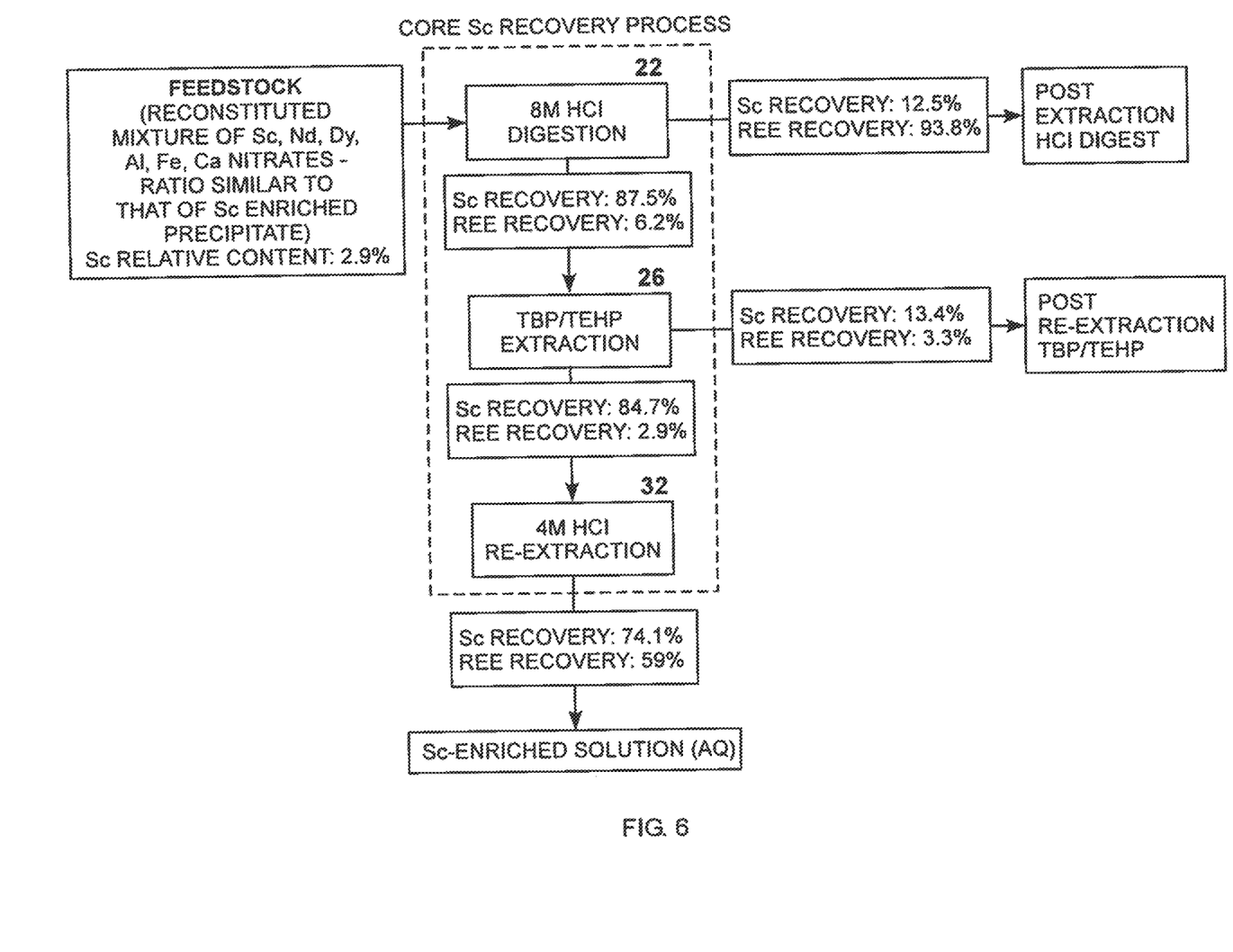
FIG. 6 is a flows chart depicting exemplary steps for a Sc extraction process.

TIAP (triisoamyl phosphate) is more hydrophobic than TBP (a solvent used to extract multivalent metals) but not readily available. The inventive approach is to increase hydrophobicity of TBP with TEHP addition (25% v/v)—see FIG. 5B (both TBP and TEHP are readily available from commercial sources). One exemplary process is outlined in FIG. 6.

Figure 7A:
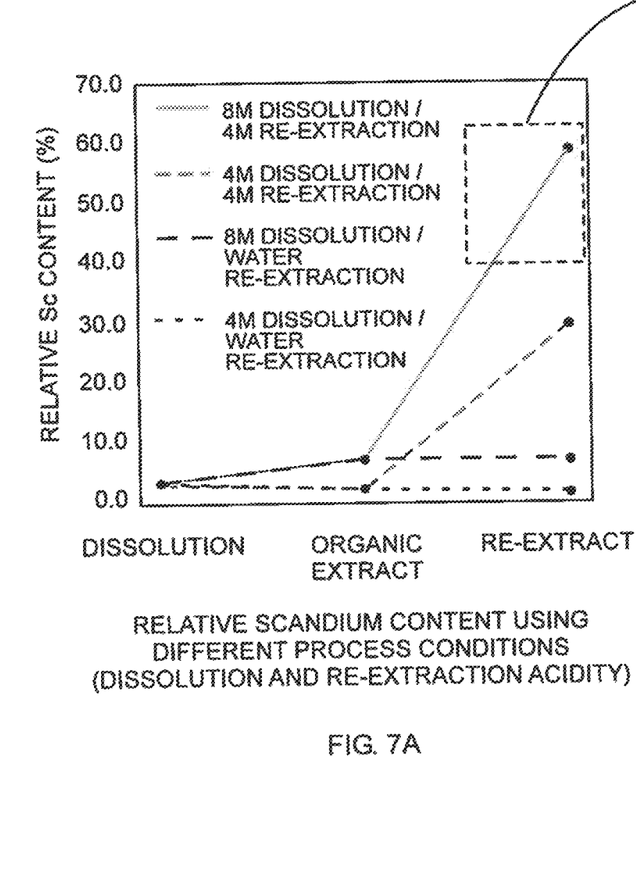
FIGS. 7A-7B are experimental results of Sc extraction.
Figure 7B:
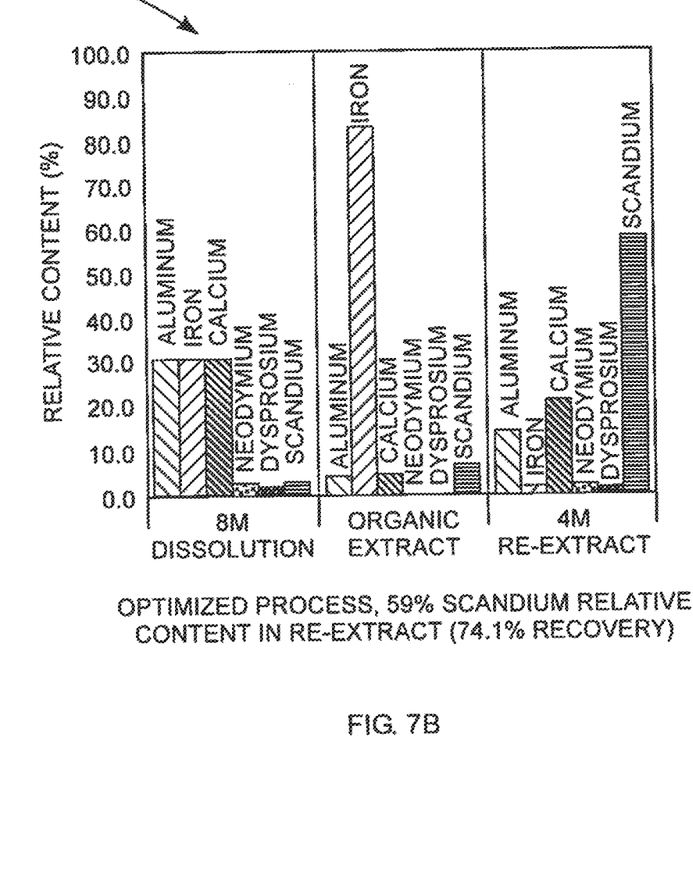

The solid nitrate mixture was dissolved in 8M HCl (step 22) and the resulting solution was extracted with the TBP/TEHP mixture (step 26). The organic solution was re-extracted with 4M HCl (step 32) to produce the final aqueous solution. The dissolved solids have a relative content of Sc (elemental basis) of 59% (20× enrichment) and the overall Sc recovery was determined to be 74.1%. FIGS. 7A-7B outline the results of various experiments that provided the optimized conditions.

Figure 8:
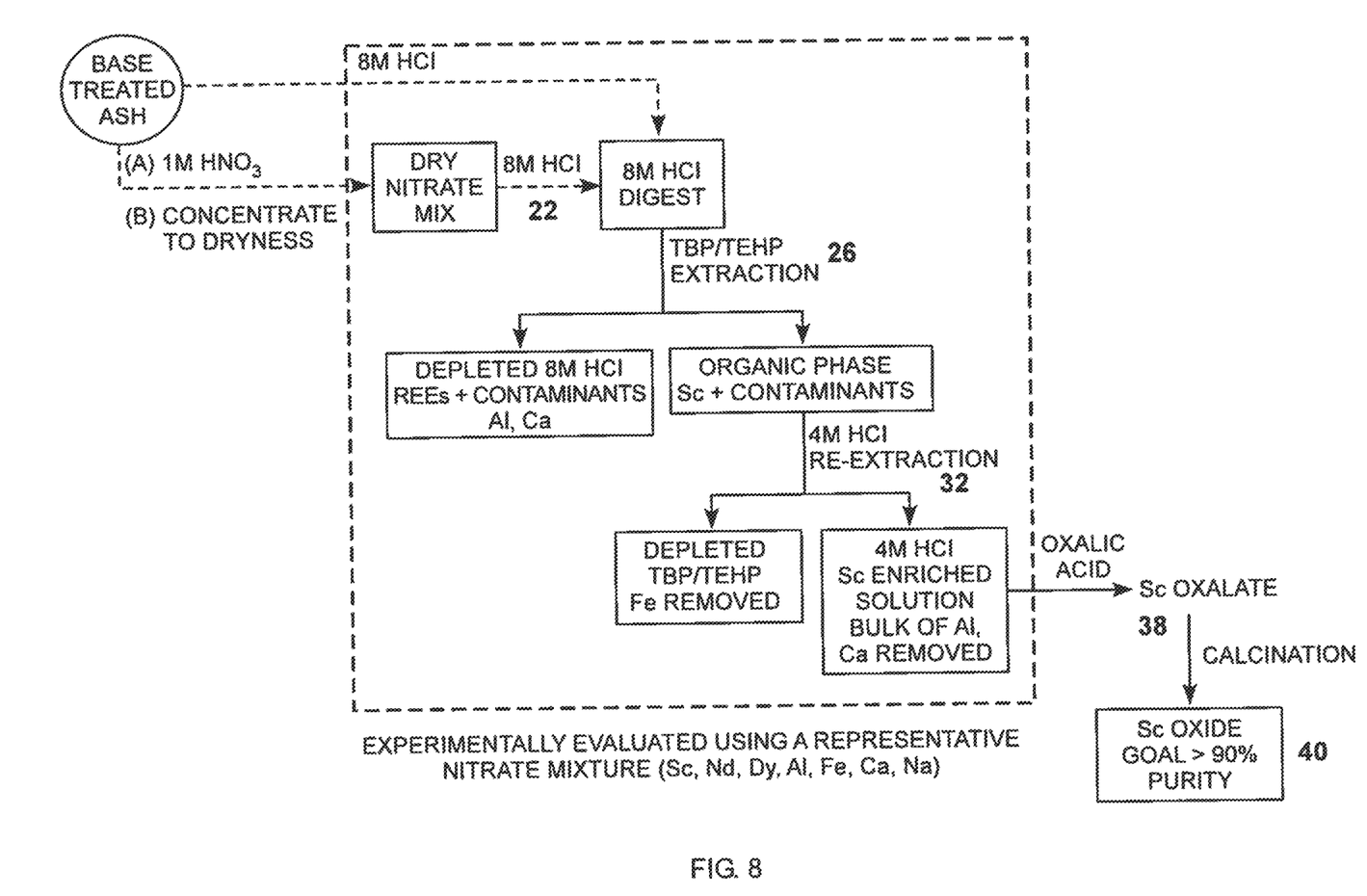
FIG. 8 is a flow chart depicting exemplary steps for Sc extraction process applied to coal ash digest.

This process was also applied to a nitrate mix with a much lower Sc content (0.02% relative content). This nitrate mixture (Sc, Nd, Dy, Al, Fe, Ca, Na nitrates) was representative of a base treated ash digest obtained in the REE recovery process (similar elemental ratios). The process is outlined in FIG. 8.

Figure 9A:
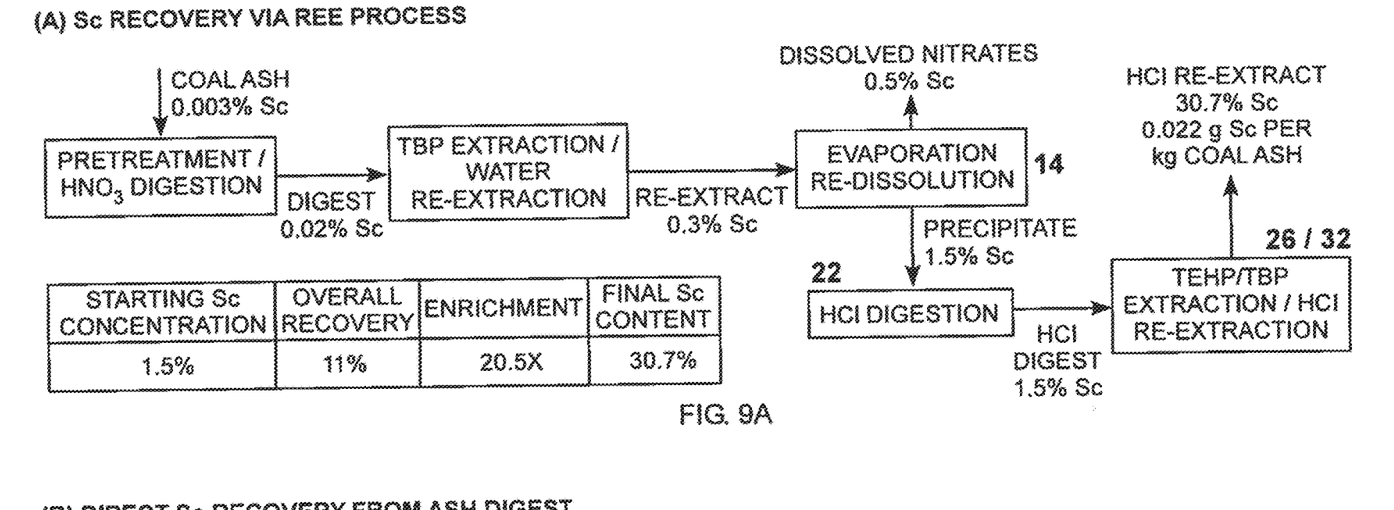
FIGS. 9A-9B are flow charts depicting a comparative analysis of Sc recovery.
Figure 9B:
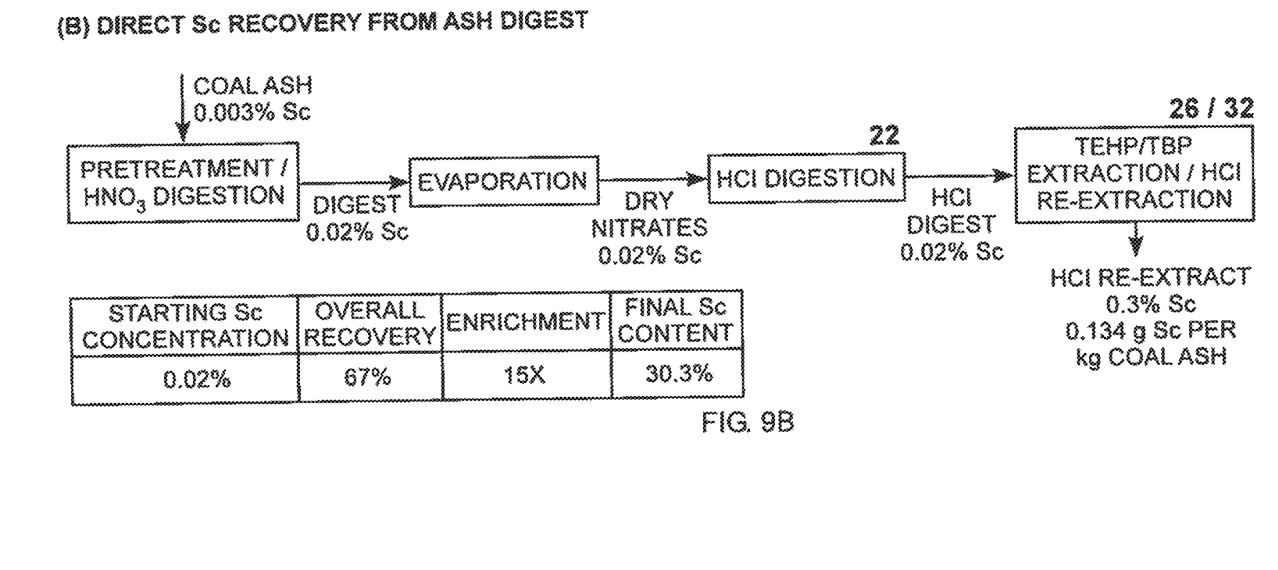

The process resulted in a 67% Sc recovery and 15× enrichment (0.3% Sc relative content in the final sample). This result indicated that the Sc extraction process can be applied to a broad range of starting concentrations to provide combined high recovery and high enrichment. The results were used to produce a comparative analysis for the Sc recovery from coal ash using the PSI REE process (FIG. 9A) or the direct recovery from coal ash digest (FIG. 9B). The projected results based on this analysis are shown.

Figure 10A:
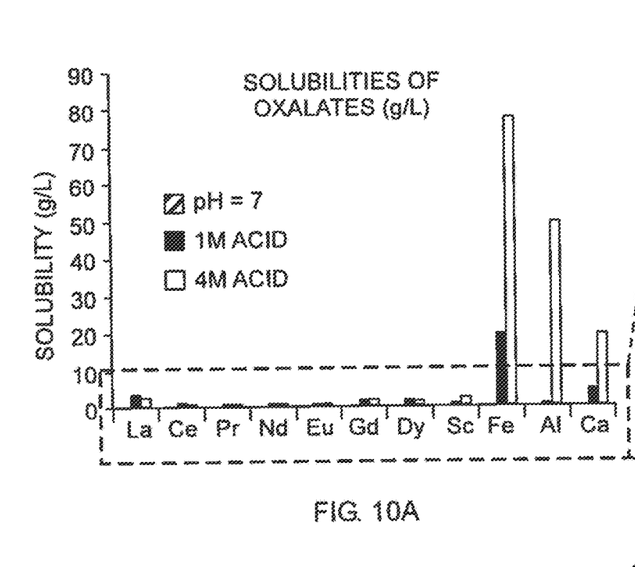
FIGS. 10A-10C are graphs depicting an analysis of Sc enrichment by selective precipitation.
Figure 10B:
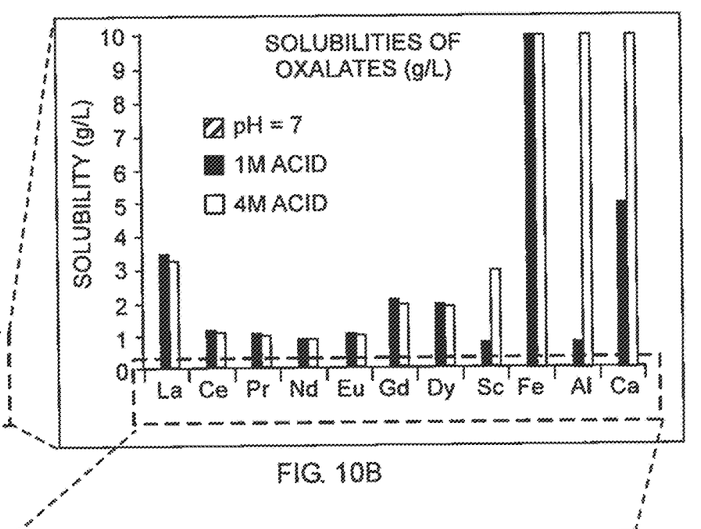
Figure 10C:
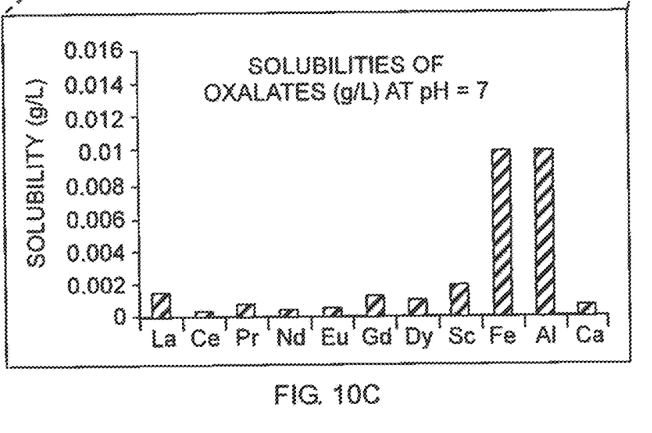

The final steps of the Sc recovery from complex mixtures are the precipitation as oxalate followed by calcination (step 38) to produce the oxide 40. A preliminary feasibility analysis was performed for the enrichment of Sc by selective precipitation. The analysis indicated that further enrichment of Sc and REEs could be achieved by selective precipitation as oxalates under acidic conditions as shown in FIGS. 10A-10C.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

What is claimed is:

1. A method of separating scandium from a coal ash feedstock, the method comprising:
    producing a dry mixture of nitrates of rare earth elements and scandium from the coal ash feedstock;
    producing a scandium enriched solution from the dry mixture by selective dissolution;
    extracting the scandium enriched solution to produce an organic phase of the scandium enriched solution;
    re-extracting the organic phase of the scandium enriched solution to produce an aqueous phase including scandium chloride separated from the rare earth elements; and
    precipitating and calcining the aqueous phase to produce scandium oxide powder.

2. The method of claim 1 in which extracting the scandium enriched solution includes adding one or more solvents to the scandium enriched solution.

3. The method of claim 2 in which the solvents include tributyl phosphate (TBP) and tris-2-ethylhexylphosphate (TEHP).

4. The method of claim 1 in which re-extracting the organic phase includes adding an acid to the organic phase.

5. The method of claim 1 further including subjecting the feedstock to a recovery process to produce a concentrate.

6. The method of claim 5 in which the concentrate is made into a slurry and filtered to produce a solid precipitate made into the scandium enriched solution by dissolution.

7. A method of separating scandium from a coal ash feedstock, the method comprising:

producing a dry mixture of nitrates of rare earth elements and scandium from a coal ash feedstock;

producing a scandium enriched solution from the dry mixture by selective dissolution;

extracting the scandium enriched solution to produce an organic phase of the scandium enriched solution by adding one or more solvents to the scandium enriched solution;

re-extracting the organic phase of the scandium enriched solution to produce an aqueous phase including scandium chloride separate from the rare earth elements by adding an acid to the organic phase; and precipitating and calcining the aqueous phase to produce scandium oxide powder.

8. The method of claim 7 in which the solvents include tributyl phosphate (TBP) and tris-2-ethylhexylphosphate (TEHP).

9. The method of claim 7 further including subjecting the feedstock to a recovery process to produce a concentrate.

10. The method of claim 9 in which the concentrate is made into a slurry and filtered to produce a solid precipitate made into the scandium enriched solution by dissolution.

\* \* \* \* \*